Sept. 24, 1935.　　　　S. SVENSSON　　　　2,015,203
MOWING MACHINE
Filed April 25, 1935
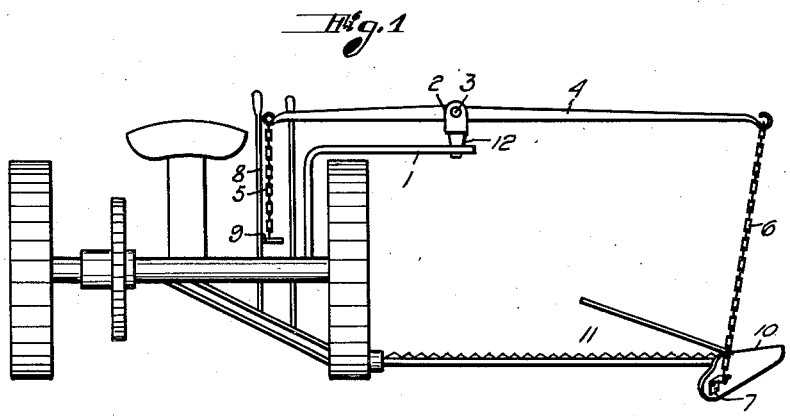
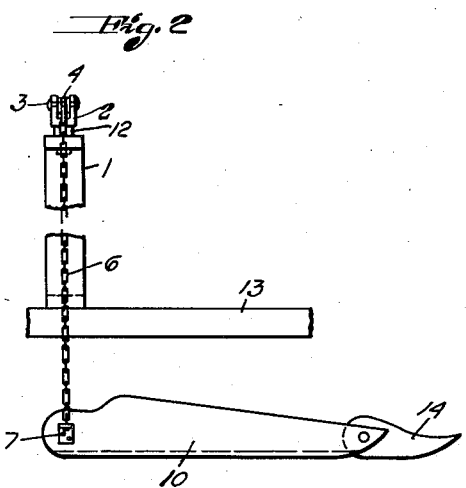
S. Svensson
INVENTOR
By Glascock Downing & Seebold
Attys.

Patented Sept. 24, 1935

2,015,203

UNITED STATES PATENT OFFICE 2,015,203

MOWING MACHINE

Svante Svensson, Tidavad, Sweden

Application April 25, 1935, Serial No. 18,192
In Sweden December 22, 1933

1 Claim. (Cl. 56—314)

The present invention relates to mowing machines of the well-known type comprising a cutting mechanism capable of being raised and lowered relatively to the ground by means of ordinary manoeuvring members (hand-levers or pedals) and a swath board attached to the outer sliding shoe of said cutting mechanism.

In turning and particularly in running backwards with such machines it often happens that the swath board digs into the ground resulting in that the mowing-machine will be exposed to very great stresses, so that in many cases the pulling rod and also the gearing members will burst. Also the swath board itself and the sliding shoe, to which it is attached, are often damaged.

The invention has for its object to avoid the above drawbacks by presenting means for raising the swath board when turning or running backwards with the mowing-machine.

A form of embodiment of the invention is shown in the annexed drawing. Fig. 1 indicates diagrammatically a mowing-machine viewed from the rear end and having a device according to the invention applied thereto. Fig. 2 is a side view of said device.

The hand lever 8, the pedal 9, the cutting mechanism 11 and the swath board 10 are all parts common to ordinary mowing-machines and need not be particularly described or shown in detail. The bent iron bar 1, the lever 4, the fork 2 with its stud 12, the bolt 3 and the chains 5 and 6 are the parts, which constitute the invention in the form of embodiment shown.

The bent iron bar 1 is secured to a part 13, Fig. 2, of the machine frame in any convenient manner, which may vary somewhat according to different types of mowing-machines. The bar 1 is provided at its horizontal leg near the end thereof with a square, somewhat tapered aperture, in which the fork 2 is placed with its stud 12. Hinged to the fork 2 by means of the bolt 3 is the lever 4, which with its end directed towards the machine is connected to the hand lever 8 or the pedal 9 as the case may be by means of the chain 5. The outer end of the lever 4 is connected to a hook 7 at the rear end of the swath board 10 by means of the second chain 6. The swath board is pivotally connected to the outer sliding shoe 14 of the cutting mechanism 11 in ordinary manner.

When at turning or running backwards the cutting mechanism is raised from the ground by means of the hand lever 8 or the pedal 9 as usual, the movement of said lever or pedal will be transmitted to the lever 4 through the chain 5, and the lever 4 will in turn by the aid of the chain 6 transmit the movement to the hook 7, so that the rear end of the swath board will be turned upwards simultaneously with the raising of the cutting mechanism. The hook 7 may preferably project to some distance from the outer side of the swath board.

The fulcrum 3 of the lever 4 is so located that the length of the outer arm of the lever will be about twice that of the inner arm, so that the movement of the hand lever 8 or the pedal 9 imparted to the swath board will be magnified.

When the device is not to be used, for instance on the way home or away, the chains 5 and 6 may be unhooked and the fork 12 with the lever 4 lifted and turned 90° and then again inserted in the aperture in the bar 1. The longitudinal direction of the lever 4 will then be parallel to the driving direction of the machine.

Obviously, the invention is not limited to the form of embodiment shown and described, but may be varied as to the constructive details without departing from the scope of the invention.

What I claim as new and desire to secure by Letters Patent of the United States of America is:—

In mowing machines of the type which comprises a frame, a cutting mechanism and an outer sliding shoe, and an adjustable member for raising and lowering said mechanism relatively to the ground and a swath board attached to the outer sliding shoe of said cutting mechanism, the combination of a support carried by the frame, a lever mounted on said support, members connecting the ends of said lever, one end to the swath board and one end to the adjusting member, whereby upon raising the cutting mechanism the swath board will also be raised.

SVANTE SVENSSON.